(12) United States Patent
Spivak et al.

(10) Patent No.: US 11,366,720 B2
(45) Date of Patent: Jun. 21, 2022

(54) BUILDING A RESILIENT OPERATING SYSTEM BASED ON DURABLE SERVICES WITH KERNEL SUPPORT

(71) Applicant: Facebook Technologies, LLC, Menlo Park, CA (US)

(72) Inventors: Vadim Victor Spivak, Redwood City, CA (US); Bernhard Poess, Redmond, WA (US)

(73) Assignee: Facebook Technologies, LLC., Menlo Park, CA (US)

( * ) Notice: Subject to any disclaimer, the term of this patent is extended or adjusted under 35 U.S.C. 154(b) by 433 days.

(21) Appl. No.: 16/529,678

(22) Filed: Aug. 1, 2019

(65) Prior Publication Data

US 2021/0034408 A1 Feb. 4, 2021

(51) Int. Cl.
*G06F 11/00* (2006.01)
*G06F 11/14* (2006.01)
*G06F 9/4401* (2018.01)
*G06F 9/48* (2006.01)

(52) U.S. Cl.
CPC ........ *G06F 11/1407* (2013.01); *G06F 9/4418* (2013.01); *G06F 9/485* (2013.01); *G06F 11/1417* (2013.01)

(58) Field of Classification Search
CPC .... G06F 9/4418; G06F 9/485; G06F 11/1407; G06F 11/1417
See application file for complete search history.

(56) References Cited

U.S. PATENT DOCUMENTS

| 6,401,216 | B1 * | 6/2002 | Meth | G06F 11/1458 |
| | | | | 712/228 |
| 2008/0270422 | A1 * | 10/2008 | Craft | G06F 11/1438 |
| 2010/0082816 | A1 * | 4/2010 | Kharat | G06F 9/54 |
| | | | | 709/226 |
| 2016/0124814 | A1 * | 5/2016 | Joseph | G06F 3/061 |
| | | | | 714/19 |
| 2016/0342485 | A1 * | 11/2016 | McHugh | G06Q 30/0241 |
| 2020/0349008 | A1 * | 11/2020 | Dawkins | G06F 11/1458 |

OTHER PUBLICATIONS

International Search Report and Written Opinion for International Application No. PCT/US2020/043571, dated Oct. 13, 2020.

* cited by examiner

*Primary Examiner* — Joshua P Lottich
(74) *Attorney, Agent, or Firm* — Baker Botts L.L.P.

(57) ABSTRACT

In one embodiment, a method includes generating a handle that references a checkpoint for a service, sending the handle to the service, wherein the handle is configured to be used by the service to store one or more states of the service in the checkpoint, determining that the service needs to be restarted, restarting the service, accessing the handle for the checkpoint, and sending the handle for the checkpoint to the restarted service, wherein the handle for the checkpoint is configured to be used by the restarted service to restore the one or more states.

18 Claims, 3 Drawing Sheets

BUILDING A RESILIENT OPERATING SYSTEM BASED ON DURABLE SERVICES WITH KERNEL SUPPORT

TECHNICAL FIELD

This disclosure generally relates to operating systems.

BACKGROUND

An operating system (OS) is system software that manages computer hardware and software resources and provides common services for computer programs. Time-sharing operating systems schedule tasks for efficient use of the system and may also include accounting software for cost allocation of processor time, mass storage, printing, and other resources. For hardware functions such as input and output and memory allocation, the operating system acts as an intermediary between programs and the computer hardware, although the application code is usually executed directly by the hardware and frequently makes system calls to an OS function or is interrupted by it. Operating systems are found on many devices that contain a computer—from cellular phones and video game consoles to web servers and supercomputers.

In computing, a process is the instance of a computer program that is being executed by one or many threads. It contains the program code and its activity. Depending on the operating system (OS), a process may be made up of multiple threads of execution that execute instructions concurrently. While a computer program is a passive collection of instructions, a process is the actual execution of those instructions. Several processes may be associated with the same program; for example, opening up several instances of the same program often results in more than one process being executed. Process management is an integral part of any modern-day operating system (OS). The OS must allocate resources to processes, enable processes to share and exchange information, protect the resources of each process from other processes and enable synchronization among processes. To meet these requirements, the OS must maintain a data structure for each process, which describes the state and resource ownership of that process, and which enables the OS to exert control over each process.

SUMMARY OF PARTICULAR EMBODIMENTS

In particular embodiments, an operating system of a computing system may effectively recover a crashed service in a microkernel without restarting the operating system. The operating system may run multiple services but if some of them ever crash or have to be restarted, the relevant data may be lost which may be detrimental for the operating system if the system has to be restarted. To address such issue, the embodiments disclosed herein may build a resilient operating system that can restart a crashed service and restore its pre-crash state without restarting the operating system. The essential technique may include maintaining the state of each service by establishing a special contract with the microkernel through an API provided by the microkernel. The contract may provide special pages of memory where the service can checkpoint its state, specifically a state that cannot be recovered automatically. In addition, the pages provided to one service may be separated from the pages provided to other services so there is less chance of corrupting the state if there is a crash. As an example and not by way of limitation, a launcher service in the operating system may be responsible for keeping track of all the services that have been launched and are currently actively running. When the operating system implements the service list, it may request the launcher service to iterate all the services that have been launched. When there is a crash, the operating system may, via a kernel API, find the checkpoint for the launcher service in the same page or set of pages and obtain a handle to the checkpoint. During the restarting of the launcher service, the loader service would transfer the handle to the newly-started launcher service. Through the handle, the launcher service could retrieve its state prior to crashing. Although this disclosure describes restoring particular state via particular systems in particular manners, this disclosure contemplates restoring any suitable state via any suitable system in any suitable manner.

In particular embodiments, the operation system may generate, for a first service, a handle that references a checkpoint. The operating system may then send the handle to the first service. The handle may be configured to be used by the first service to store one or more states of the service in the checkpoint. In particular embodiments, the operating system may determine that the first service needs to be restarted. The operating system may then restart the first service. The operating system may further access the handle for the checkpoint. In particular embodiments, the operating system may send the handle for the checkpoint to the restarted first service. The handle for the checkpoint may be configured to be used by the restarted first service to restore the one or more states.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
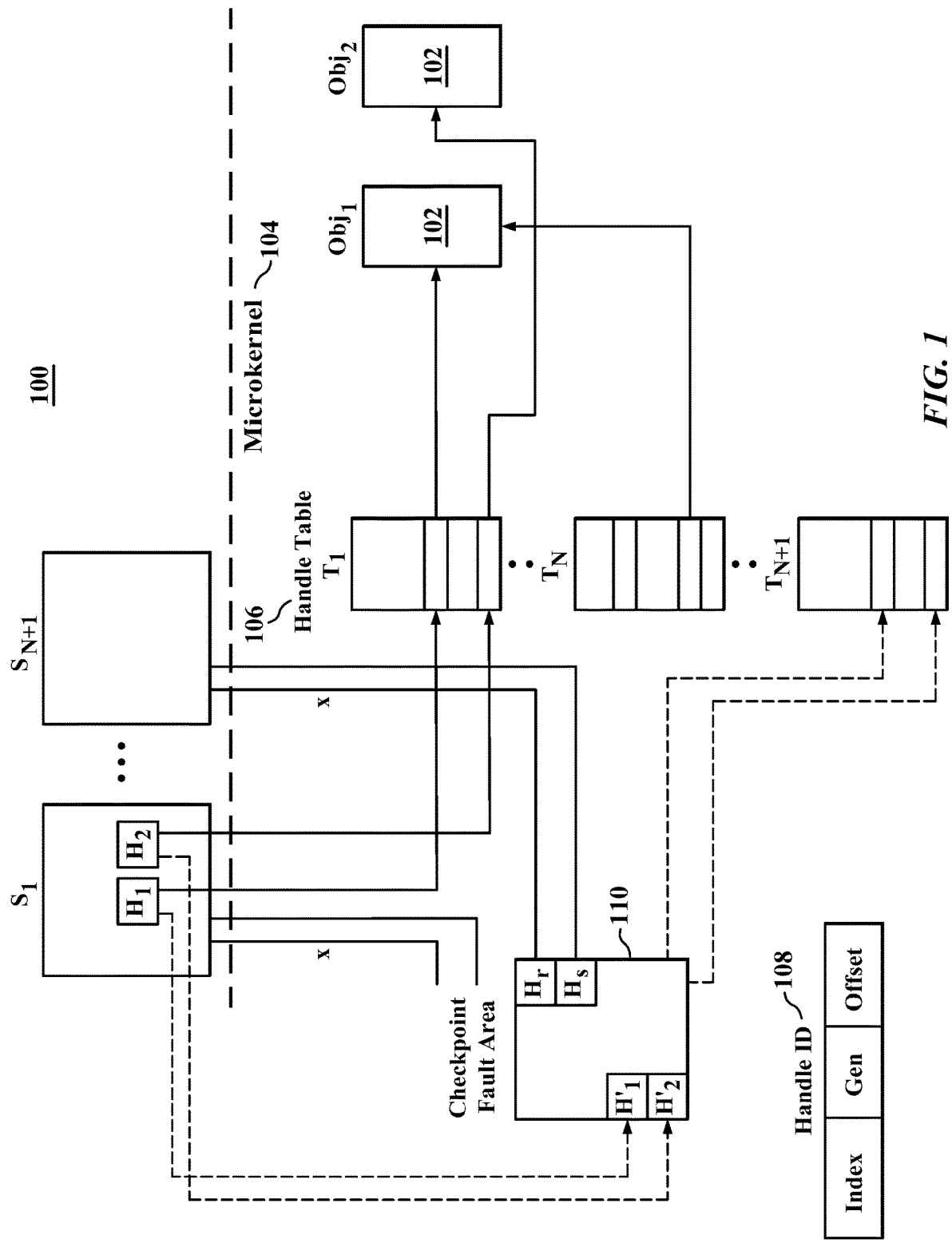
FIG. 1 illustrates an example diagram flow of reconstruction of handle table values associated with restarting a service.

In particular embodiments, an operating system of a computing system may effectively recover a crashed service in a microkernel without restarting the operating system. The operating system may run multiple services but if some of them ever crash or have to be restarted, the relevant data may be lost which may be detrimental for the operating system if the system has to be restarted. To address such issue, the embodiments disclosed herein may build a resilient operating system that can restart a crashed service and restore its pre-crash state without restarting the operating system. The essential technique may include maintaining the state of each service by establishing a special contract with the microkernel through an API provided by the microkernel. The contract may provide special pages of memory where the service can checkpoint its state, specifically a state that cannot be recovered automatically. In addition, the pages provided to one service may be separated from the pages provided to other services so there is less chance of corrupting the state if there is a crash. As an example and not by way of limitation, a launcher service in the operating system may be responsible for keeping track of all the services that have been launched and are currently actively running. When the operating system implements the service list, it may request the launcher service to iterate all the services that have been launched. When there is a crash, the operating system may, via a kernel API, find the checkpoint for the launcher service in the same page or set of pages and obtain a handle to the checkpoint. During the restarting of the launcher service, the loader service would transfer the handle to the newly-started launcher service. Through the handle, the launcher service could retrieve its state prior to crashing. Although this disclosure describes restoring particular state via particular systems in particular manners, this disclosure contemplates restoring any suitable state via any suitable system in any suitable manner.

In particular embodiments, the operation system may generate, for a first service, a handle that references a checkpoint. The operating system may then send the handle to the first service. The handle may be configured to be used by the first service to store one or more states of the first service in the checkpoint. In particular embodiments, the operating system may determine that the first service needs to be restarted. The operating system may then restart the first service. The operating system may further access the handle for the checkpoint. In particular embodiments, the operating system may send the handle for the checkpoint to the restarted first service. The handle for the checkpoint may be configured to be used by the restarted first service to restore the one or more states.

In particular embodiments, the first service may be a component of the operating system. The first service may be isolated from the microkernel of the operating system. As a result, even if the first service crashes, it would not crash the entire operating system. Isolation alone, however, may be not enough to improve system reliability, as there needs to be a mechanism for recovering crashed services. Additionally, an operating system based on microkernels may not have storage in the microkernels. Microkernels may not have access to IO but only memory, which may require the mechanism for recovering a crashed service. The embodiments disclosed herein may provide such mechanism based on a checkpoint that stores states associated with a service, enabling the microkernels to keep track of the state of the service in case the operating system needs to restore the state after the service crashes. Although this disclosure describes particular services in particular systems in particular manners, this disclosure contemplates any suitable service in any suitable system in any suitable manner.

In particular embodiments, every time a new service starts, a managing service may assign some handles to the new service. As an example and not by way of limitation, the managing service may comprise a loader service. Handles may be used by system calls to reference kernel objects such as processes, threads, sockets, channels or interrupts. In particular embodiments, handles may reference checkpoints. In particular embodiments, a handle may have the following attributes including type (job, process, socket, channel, interrupt, etc.), access rights associated with the handle, pointer to kernel object, internal reference count, state flag (free, active, closed, etc.), linked list or bitmap to track handles which are in use by a particular process. A technical advantage of assigning a handle to each service may include that it provides a strict isolation between different services. At this point a handle is not unique across services, but the same handle value associated with a handle can reference different kernel objects in different services. Although this disclosure describes particular handles in particular systems in particular manners, this disclosure contemplates any suitable handle in any suitable system in any suitable manner.

In particular embodiments, each of the one or more states may comprise one or more of a data item or a handle. In particular embodiments, memory regions (e.g., pages) may be provided to a service that requests to checkpoint its states based on the domain associated with the service. The memory regions may be used to store the states. Within the domain, each service may have its own address span corresponding to special pages of the service. The microkernel may checkpoint a state into the address span and restore it when the service gets restarted. As an example and not by way of limitation, a launcher service may be domain one, which may include a registered state bucket. When the launcher service crashes, the operating system (e.g., via the loader service) may request the microkernel for the pages associated with the service. The microkernel may return a handle referencing the checkpoint. Based on the handle, the checkpoint may be accessed to retrieve the pages that belong to domain one. Although this disclosure describes particular memory regions in particular systems in particular manners, this disclosure contemplates any suitable memory region in any suitable system in any suitable manner.

In particular embodiments, the first service may determine what state to checkpoint based on the type of the first service. As an example and not by way of limitation, for the launcher service, it may have a lot of data. The launcher service may keep track of states of how much memory is being consumed and how many other resources are still available. These states are easy to restore so the launcher service may not checkpoint them. The launcher service may instead checkpoint states that are more difficult to restore. In particular embodiments, the operating system may further generate a first key for the checkpoint. Accessing the handle for the checkpoint at a later time may be based on the first key. Although this disclosure describes storing particular states via particular systems in particular manners, this disclosure contemplates storing any suitable state via any suitable system in any suitable manner.

In particular embodiments, the first service may be associated with a monitor. Determining that the first service needs to be restarted may be based on the monitor. In particular embodiments, determining that the first service needs to be restarted may be based on an indication that the first service is nonresponsive. As an example and not by way of limitation, a crash of the service may cause the service to be nonresponsive. In particular embodiments, restarting the first service may not require restarting one or more microkernels or second services. The one or more microkernels or second services may be components of the operating system. Although this disclosure describes determining particular restarts via particular systems in particular manners, this disclosure contemplates determining any suitable restart via any suitable system in any suitable manner.

In particular embodiments, accessing the handle may comprise accessing a service-key index comprising a plurality of entries corresponding to a plurality of services. Each entry in the service-key index may comprise a service identifier and a key associated with the service identifier. In particular embodiments, the first service may be associated with a first service identifier. Accordingly, accessing the handle may further comprise the following steps. Firstly, the operating system may identify, based on the first service identifier, a first key from the service-key index. The operating system may then retrieve, based on the identified first key, the handle from a plurality of handles referencing a plurality of checkpoints associated with a plurality of services. Although this disclosure describes accessing particular indexes via particular systems in particular manners, this disclosure contemplates accessing any suitable index via any suitable system in any suitable manner.

FIG. 1 illustrates an example diagram flow 100 of reconstruction of handle table values associated with restarting a service. In particular embodiments, a handle may point to an object and may be made up of an actual object 102 itself in the microkernel 104. The microkernel 104 may create a handle table 106 associated with one or more handles for a new service. As displayed in FIG. 1, the new service may be denoted by $S_1$ which may have two handles, i.e., $H_1$ and $H_2$. A handle table $T_1$ may be created for the two handles. The microkernel 104 may need to transform the handles into handle values in the handle table 106 for the service. Hence, a handle may have an opaque integer which the microkernel 104 may index via the handle table 106. In particular embodiments, each handle may have information stored in the handle table 106. The information associated with a handle may comprise a handle ID 108, which may further comprise an index, a generation field, and an offset field. As indicated in FIG. 1, each handle may point to an object 102, i.e., $H_1$ pointing to object 1 ($obj_1$) and $H_2$ pointing to object 2 ($obj_2$). The handle values for each handle in a handle table 106 may change if the service restarts. However, the index of the handles may remain the same. In other words, the opaque integer the service had before may not map to anything in the recreated handle table 106 and the microkernel 104 may not be able to locate an object 102 that a handle points to. As a result, the durable service provided by the operating system should guarantee that when checkpointing a state, a list of handles should be stored as well in the microkernel 104 and that the handle table 106 should be recreated for those handles when the service restarts. As displayed in FIG. 2, the microkernel 104 may store the two handles pointing to objects 102 in a checkpoint fault area 110. As displayed in FIG. 1, storing the two handles may result in a record of the handles, i.e., $H'_1$ and $H'_2$. In particular embodiments, when a service crashes its handle table 106 may go away. When the service restarts, it may get the special space back (i.e., the checkpoint fault area 110). As indicated in FIG. 1, the restarted service is denoted as $SN_{+1}$. The restarted service may be assigned two handles $H_r$ and $H_s$. The microkernel 104 may need to make sure that these handles are still active handles in the restarted service by recreating a handle table 106 for the restarted service, indicated by $T_{N+1}$ in FIG. 1. Although this disclosure describes particular diagram flow of recreating particular handle tables in particular manners, this disclosure contemplates any suitable diagram flow of recreating any suitable handle table in any suitable manner.

Figure 2:
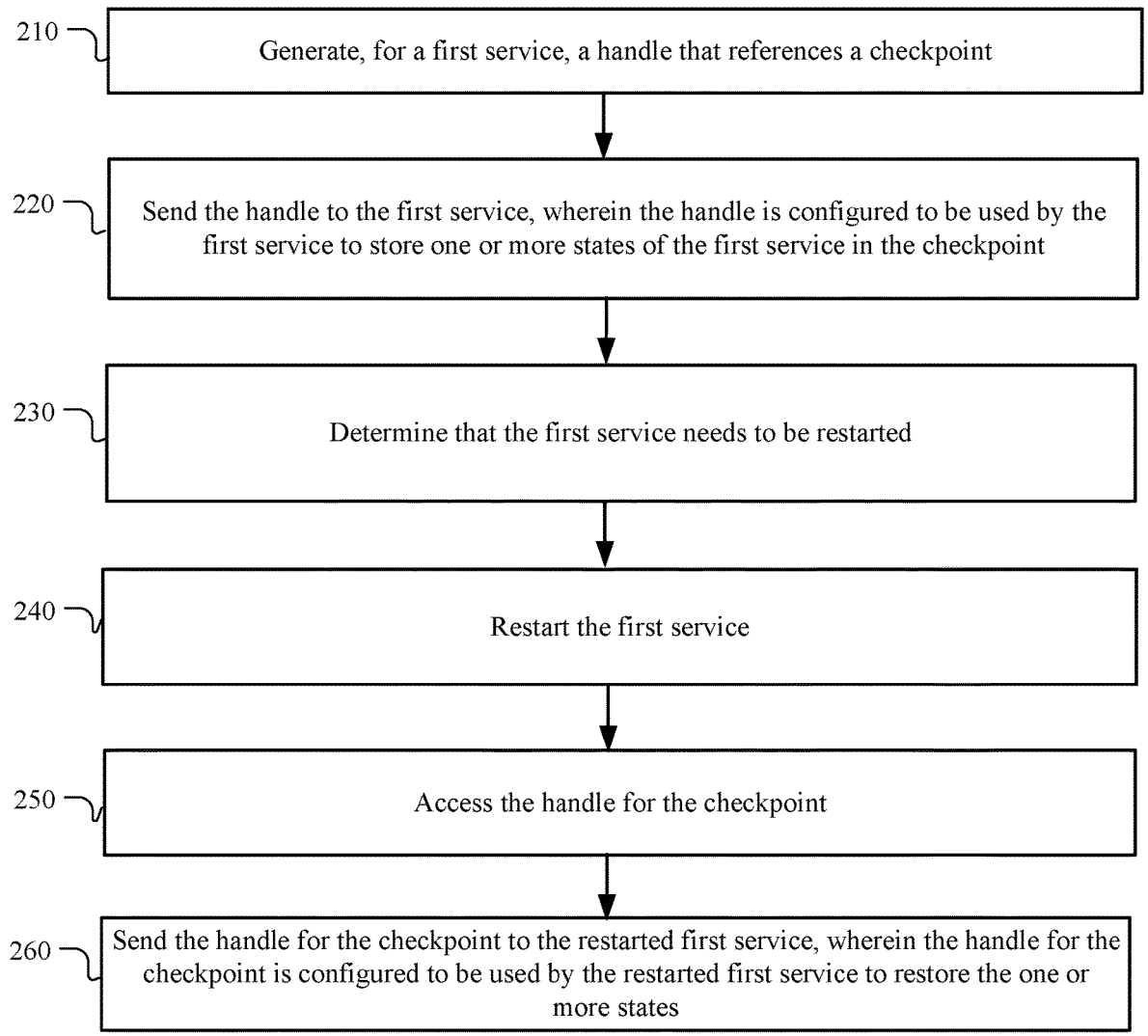
FIG. 2 illustrates an example method for restoring states of a service.

FIG. 2 illustrates an example method 200 for restoring states of a service. The method may begin at step 210, where the operating system may generate, for a first service, a handle that references a checkpoint. At step 220, the operating system may send the handle to the first service, wherein the handle is configured to be used by the first service to store one or more states of the first service in the checkpoint. At step 230, the operating system may determine that the first service needs to be restarted. At step 240, the operating system may restart the first service. At step 250, the operating system may access the handle for the checkpoint. At step 260, the operating system may send the handle for the checkpoint to the restarted first service, wherein the handle for the checkpoint is configured to be used by the restarted first service to restore the one or more states. Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for restoring states of a service including the particular steps of the method of FIG. 2, this disclosure contemplates any suitable method for restoring states of a service including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 3:
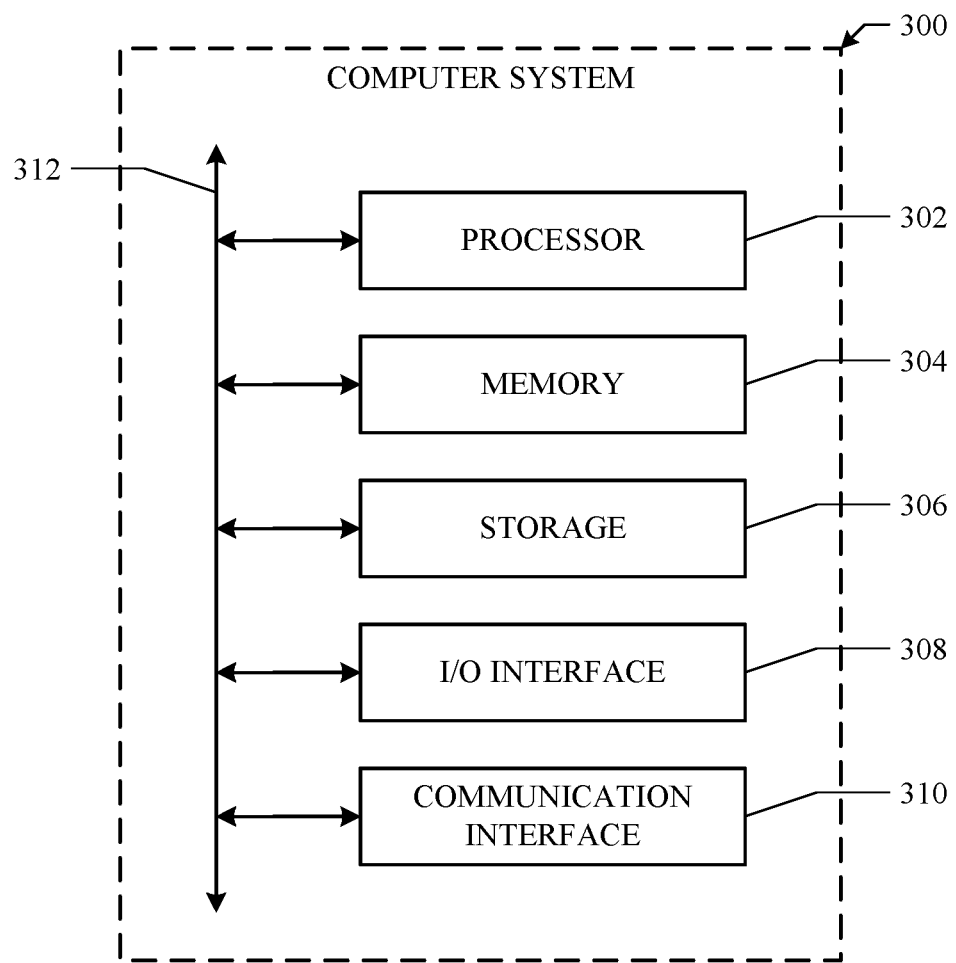
FIG. 3 illustrates an example computer system.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an operating system executing on a computing device:
    generating, for a first service monitored by a monitor, a handle that references a checkpoint;
    sending the handle to the first service, wherein the handle is configured to be used by the first service to store one or more states of the first service in the checkpoint;
    determining that the first service needs to be restarted based on the monitor;
    restarting the first service;
    accessing the handle for the checkpoint; and
    sending the handle for the checkpoint to the restarted first service, wherein the handle for the checkpoint is configured to be used by the restarted first service to restore the one or more states.

2. The method of claim 1, further comprising generating a first key for the checkpoint, wherein accessing the handle for the checkpoint is based on the first key.

3. The method of claim 1, wherein the first service is a component of the operating system.

4. The method of claim 1, wherein determining that the first service needs to be restarted is based on an indication that the first service is nonresponsive.

5. The method of claim 1, wherein accessing the handle comprises accessing a service-key index comprising a plurality of entries corresponding to a plurality of services, wherein each entry in the service-key index comprises a service identifier and a key associated with the service identifier.

6. The method of claim 5, wherein the first service is associated with a first service identifier, and wherein accessing the handle further comprises:
    identifying, based on the first service identifier, a first key from the service-key index.

7. The method of claim 6, wherein accessing the handle further comprises:
    retrieving, based on the identified first key, the handle from a plurality of handles referencing a plurality of checkpoints associated with a plurality of services.

8. The method of claim 1, wherein each of the one or more states comprises one or more of a data item or a handle.

9. The method of claim 1, wherein restarting the first service does not require restarting one or more microkernels or second services, and wherein the one or more microkernels or second services are components of the operating system.

10. One or more computer-readable non-transitory storage media embodying software that is operable when executed to:
    generate, for a first service monitored by a monitor, a handle that references a checkpoint;
    send the handle to the first service, wherein the handle is configured to be used by the first service to store one or more states of the first service in the checkpoint;
    determine that the first service needs to be restarted based on the monitor;
    restart the first service;
    access the handle for the checkpoint; and
    send the handle for the checkpoint to the restarted first service, wherein the handle for the checkpoint is configured to be used by the restarted first service to restore the one or more states.

11. The media of claim 10, wherein the software is further operable when executed to generate a first key for the checkpoint, wherein accessing the handle for the checkpoint is based on the first key.

12. The media of claim 10, wherein the first service is a component of the operating system.

13. The media of claim 10, wherein determining that the first service needs to be restarted is based on an indication that the first service is nonresponsive.

14. The media of claim 10, wherein accessing the handle comprises accessing a service-key index comprising a plurality of entries corresponding to a plurality of services, wherein each entry in the service-key index comprises a service identifier and a key associated with the service identifier.

15. The media of claim 14, wherein the first service is associated with a first service identifier, and wherein accessing the handle further comprises:
    identifying, based on the first service identifier, a first key from the service-key index.

16. The media of claim 15, wherein accessing the handle further comprises:
    retrieving, based on the identified first key, the handle from a plurality of handles referencing a plurality of checkpoints associated with a plurality of services.

17. The media of claim 10, wherein each of the one or more states comprises one or more of a data item or a handle.

18. A system comprising: one or more processors; and a non-transitory memory coupled to the processors comprising instructions executable by the processors, the processors operable when executing the instructions to:
    generate, for a first service monitored by a monitor, a handle that references a checkpoint;
    send the handle to the first service, wherein the handle is configured to be used by the first service to store one or more states of the first service in the checkpoint;
    determine that the first service needs to be restarted based on the monitor;
    restart the first service;
    access the handle for the checkpoint; and
    send the handle for the checkpoint to the restarted first service, wherein the handle for the checkpoint is configured to be used by the restarted first service to restore the one or more states.

* * * * *